Figure 3:
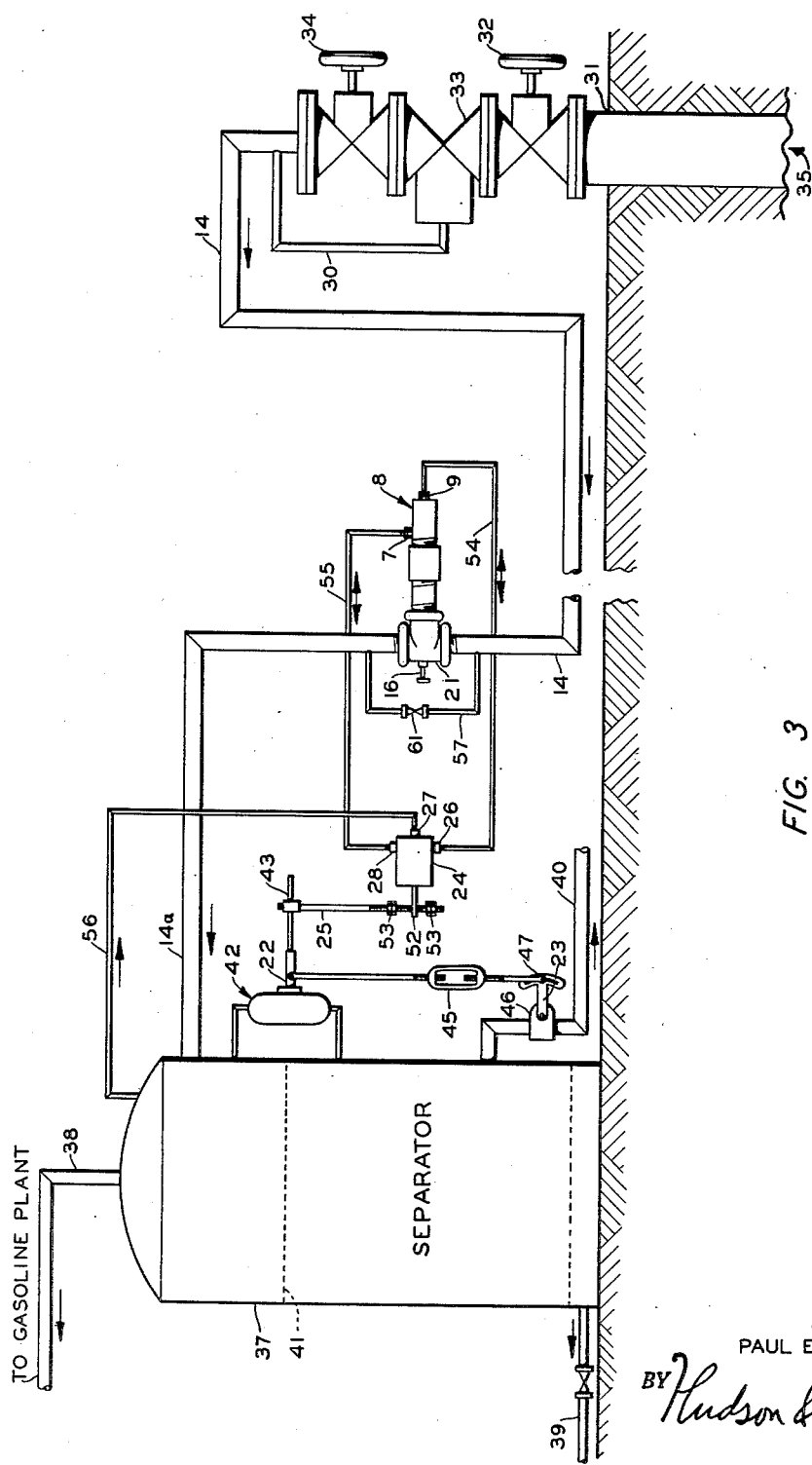

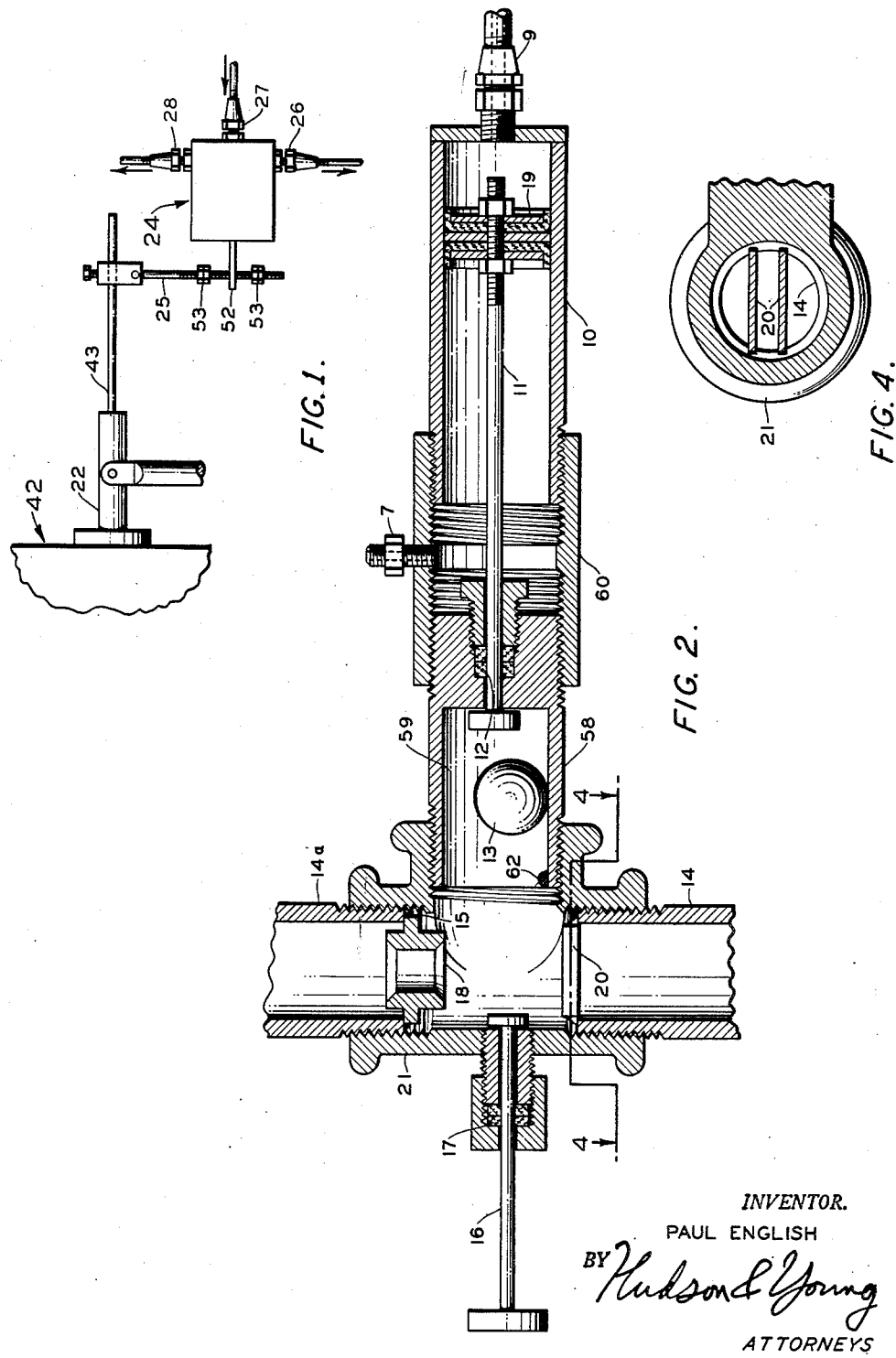

June 29, 1954

P. ENGLISH 2,682,278

AUTOMATIC SHUT-DOWN DEVICE FOR WELLS

Filed Dec. 27, 1949

2 Sheets-Sheet 2

INVENTOR.
PAUL ENGLISH
BY Hudson & Young
ATTORNEYS

Patented June 29, 1954

2,682,278

UNITED STATES PATENT OFFICE 2,682,278

AUTOMATIC SHUT-DOWN DEVICE FOR WELLS

Paul English, Alvin, Tex., assignor to Phillips Petroleum Company, a corporation of Delaware Application December 27, 1949, Serial No. 135,176

4 Claims. (Cl. 137—415)

1

This invention relates to safety shut-off apparatus for use in high pressure oil and gas separator systems. In one aspect, this invention relates to a safety valve apparatus for use in conjunction with distillate well separator tank assemblies.

In high pressure distillate wells, the produced fluid previously existed in the formation as vapor, but it usually reaches the surface of the ground as a mixture of vapors and condensed liquid. The fluid from these wells is then conducted to a separator tank in which the condensed liquid is separated from the vapors. This type of separator usually operates at pressures of 1000 pounds per square inch or higher. At frequent times pressures of 2000 to 3000 pounds are encountered. The vapors separated from the condensed liquid are ordinarily passed to gasoline extraction plants for recovery of condensible hydrocarbons, while the well condensate may merely be stabilized. The residue gas from these gasoline extraction and/or stabilization plants consists mainly of methane and this gas is ordinarily recycled into the distillate-producing formation for pressure maintenance purposes. One gasoline extraction plant will ordinarily process vapors from more than one distillate well separator.

Since gasoline extraction plants are designed to extract condensible vapors from hydrocarbon gas mixtures, the presence of liquid hydrocarbons in the gas going to an extraction plant should, if possible, be avoided.

Distillate from wells usually contains some moisture and under certain conditions, a portion of this moisture may condense to a liquid and accumulate in the bottom of the separator tank while the uncondensed water vapor will pass to the gasoline extraction plant with the separated gas. Since water is soluble at least to some extent in liquid hydrocarbons, some water will remain in solution or even in suspension in the condensed hydrocarbon phase of these separator tanks. When this hydrocarbon phase is removed from the separator tanks, it flows through pipes containing valves, bends, and other constrictions which cause some pressure reduction in the liquid being transported. Sometimes when pressure reduction is appreciable, some vaporization of these liquid hydrocarbons occurs with accompanying chilling due to the latent heat of vaporization. Under such conditions, hydrocarbon hydrates frequently form as solids and these solids may accumulate in the region of valves or at other points in the flow line and cause plugging of the lines. When such a flow line from a sepa-

2 rator tank becomes plugged, the separator apparatus may attempt to dump the liquid in response to a liquid level controller assembly, but dumping does not occur due to a plugged outlet line. Fluid from the well continues to enter the separator and ultimately condensate will fill the tank and liquid will leave the top of the separator through the gas line and be transported to the gasoline extraction plant. The passage of condensate to the gasoline extraction plant represents a loss of liquid at the separator and usually upsets gasoline extraction plant operation. Thus, the passage of liquefied hydrocarbons or gasoline from the separator to the gasoline extraction plant is to be avoided.

One object of my invention is to provide a safety shut-off apparatus for use in conjunction with distillate well separator tanks for prevention of loss of condensate from the separator tank.

Another object of my invention is to provide a safety shut-off apparatus for use in conjunction with distillate well separator tanks for the prevention of passage of liquid hydrocarbons to the gasoline extraction plant.

Still another object of my invention is to provide apparatus for use in conjunction with distillate well separator tanks which automatically shuts in the well in case liquid is not properly removed from the separator tank.

Still other objects and advantages of my invention will be realized upon reading the following description which, taken in conjunction with the attached drawing, forms a part of this specification.

In the drawing, Figure 1 represents a portion of the apparatus of my invention. Figure 2 is a sectional view of another portion of the apparatus of my invention. Figure 3 is a diagrammatic representation of the use of the safety device of my invention in conjunction with a distillate well-separator assembly. Figure 4 is a sectional view taken on the line 4—4 of Figure 2.

Referring now to the drawing, and specifically to Figure 3, reference numeral 35 refers to a distillate-producing well which is provided with a tubing 31. At the head of this tubing are manually operable valves 32 and 34 separated by a safety shut-in valve 33. This valve is so termed because when it closes it shuts in the well against well head pressure and production is stopped. From the manually operated valve 34, a flow line 14 leads in the direction of a condensate separator tank 37. At the discharge end of the flow line 14 is placed a safety valve 8 and to the discharge side of this safety valve is attached a flow line 14a which is intended to carry fluid on to the separator tank 37.

The separator tank 37 is provided with a bottom draw-off line 39 and with a vapor product line 38 which draws off product vapor and leads to a gasoline extraction plant. Line 40 is connected to the tank at a point some distance up from the bottom, while still higher than this pipe 40 is connected a liquid level float apparatus 42.

This float apparatus 42 is provided with a float lever 22 which moves in response to the rise and fall of a float in the float chamber. To this float lever 22 is attached a turnbuckle-rod assembly 45 which also is attached at its bottom end by pivot 47 to a valve lever 23. This valve lever 23 operates a valve 46 in line 40. When valve 46 is opened, liquid in the separator flows through pipe 40 to such disposal as desired, distillation, storage or treatment plant.

As mentioned hereinbefore, when plugging of this condensate flow line 40 occurs from any reason whatever, the opening of valve 46 by the float does not discharge the liquid contents of the separator, and in due time, liquid enters line 38 and flows to the gasoline plant.

I have provided a valve assembly 8 which is intended to operate in response to certain movements of the float attached to the accumulator tank to close off the incoming distillate well fluid. In this manner, the separator tank does not become entirely filled with liquid.

The detail of construction of the shut-off valve 8 may be seen on reference to Figure 2. The particular design and construction of this shut-off valve are given merely as an example of a type of valve which functions for the intended purpose.

This valve is composed of a ball valve operated by the movement of a piston in response to the rise and fall of the float in the separator tank. The valve assembly is composed of a T 21 to which is fastened, as for example by threads, a ball chamber element 58. This element has a chamber 59 in which a ball 13 rests when the valve is in an open position. A piston 19 reciprocates in a cylinder 10 to push and pull a piston rod 11. The cylinder 10 may be attached to the ball chamber 58 by a collar member 60. A packing gland 12 is provided in the ball chamber element 58 to prevent leakage of fluid in either direction. The T element 21 of the valve is attached to the ends of conduit 14 and 14a. A valve seat 18 is provided in the end of the conduit 14a. This valve seat 18 may be attached by a weld 15 to the end of the outlet conduit 14a, or the seat may be inserted into the end of the T as a separate element and held firmly in place by screwing in the end of the conduit 14a. Of course, a shoulder must in this case be provided to hold the seat rigidly against the end of the conduit. On the upper end of the conduit 14 is provided at least a pair of cross bars 20. These cross bars or rods 20 may be attached to the end of the conduit by welding or by any other desired means. The purpose of these support rods is to prevent the ball 13 from dropping down into conduit 14 when the ball is released from its seat 18. In the placing of these support rods 20, I prefer to place each rod sufficiently near the center of the conduit that if one of these rods should corrode and fall into the conduit that the remaining support rod would prevent the ball from falling into the conduit. A push rod assembly consisting of a push rod 16 and a packing gland 17 is provided in the side of the T 21, as illustrated, for pushing the ball back into its chamber when the valve is to be opened.

To actuate the piston 19 a conduit 54 connected to the end of the cylinder 10 is provided for transfer of fluid pressure from a pilot valve 24 into the end of the cylinder. A connection 7 is provided in the collar 60 and to connection 7 is attached a conduit 55 leading also to the pilot valve 24. The conduit 55 is attached to the pilot valve 24 by connection 28. The conduit 54 is connected to the pilot valve by connection 26 and to the cylinder 10 by connection 9. A third connection 27 on the pilot valve is connected by a conduit 56 to the top of the separator tank 37. To actuate the pilot valve there is provided a lever 52, the end of which is operatively attached to a control rod 25. This lever is maintained in an operable position with respect to the control rod 25 by two pairs of lock nuts 53. The control rod 25 is attached to an extension rod 43 which in turn is fastened rigidly to the end of the float lever 22. A by-pass conduit 57 is attached to lines 14 and 14a to by-pass the valve assembly 8 when it is desired to equalize pressure in pipes 14 and 14a. The by-pass conduit 57 is provided with a valve 61 which may be manually opened and closed as desired. Figure 1 illustrates the manner in which the pilot valve may be connected to the valve lever 22.

In the operation of the apparatus of my invention when the level of the condensate in the separator tank rises, the float in the float chamber rises also. In normal operation when this float rises to some predetermined position, the valve 46 is opened and liquid is withdrawn from the separator tank. When well fluid is flowing into the separator and liquid is not being withdrawn through pipe 40 because pipe 40 is plugged downstream from valve 46, the float continues to rise even after valve 46 has been opened. When a still higher predetermined high float position is reached, the lever arm 43 descends sufficiently that the upper lock nuts 53 trip the valve lever 52 and high pressure separator gas from conduit 56 is passed through the pilot valve 24, through connection 26, conduit 54, and connection 9 into the head end of the cylinder 10. This pressure acts on the head of the piston 19 to force the piston rod 11 from right to left, as can be seen in Figure 2. The ball 13 is pushed into the T 21 and the upward-flowing well fluid carries the ball and seats it against the seat 18. Under normal operating conditions, of course, the valve 61 in the by-pass line 57 is maintained closed. When ball 13 is seated, the flow of well fluid into the separator 37 is shut off and accordingly, the level 41 of the condensate in the separator will not rise sufficiently high that liquid will flow through line 38 to the gasoline plant.

When this shut-off valve becomes closed, well pressure in conduit 14 increases and when pressure in this line increases to, for example, 100 pounds per square inch greater than the pressure normally in line 14 during operation, this pressure is communicated through the line 30 to the safety valve 33 and this valve then automatically closes and the well is shut in at the head of the tubing and the well accordingly remains in this condition until an operator corrects the plugged conditions in conduit 40.

When the plug has been removed from conduit 40, condensate from the separator will then flow through valve 46 and line 40 since valve 46 is already open due to the high position of the float. When the liquid level 41 reaches a predetermined low position, the extended rod 43 rises followed by the control rod 25, and the lower lock nut 53 raises the pilot valve lever 52 and high pressure fluid from line 56 passes through the pilot valve and through connection 28, line 55, and connection 7 to the space behind the piston 19. This fluid pressure then causes the piston 19 to move from left to right, as in Figure 2. However, the ball 13 remains against seat 18 regardless of the position of the piston 19 and rod 11.

To open this ball valve, the hand-operated valve 61 in the by-pass line 57 is opened so that fluid from conduit 14 may pass into conduit 14a. When pressures in conduits 14 and 14a have become equalized, the ball 13 will fall by gravity upon the support rods 20 and then the push rod 16 may be operated by hand to push the ball 13 from its position on the support rods 20 into the chamber 59.

If desired, though not necessary, a small elevated point or member 62 may be provided at the open end of the chamber 59 so that the ball 13 will not roll of its own accord from the chamber 59 to the support rods 20. This rolling of ball 13 on to the support rods 20 would close the valve at times perhaps when it is desired not to close the valve. Such condition might exist when the apparatus is slightly out of level. Thus the raised point 62 would then serve as a safety measure to keep the valve open at all times until the ball 13 is pushed by the rod 11 over the hump 62.

Pilot valves, such as the 3-way pilot valve herein mentioned, are standard articles of commerce and their construction and operation are well-known by those skilled in the art.

When the ball valve 13 has been dropped from its seat 18 due to equalization of pressure in flow lines 14 and 14a and has been pushed from the line of flow of well fluid into chamber 59 by push rod 16 and when pressure in this line decreases to a value less than 100 pounds greater than the normal intended operating pressure in conduit 14, the safety valve 33 opens automatically and after closing the by-pass valve 61, the separator apparatus is in operation.

Conduit 39 is shown as connected to the bottom portion of the separator tank and this conduit is intended to be a water-draw in case liquid water separates from the condensate. If desired, a float controller assembly may be installed to control the withdrawal of the water. Such an assembly might be useful in case sufficient water is produced from the well to warrant the added expense.

The above-described safety apparatus is given for illustrative purposes and should not be regarded as limiting the invention, the scope of which is set forth in the following claims.

Having described my invention, I claim:

1. An apparatus for control of the flow of fluid into and out of a high pressure oil and gas separator tank comprising, in combination, a high pressure separator tank, an outlet line near the top of said tank for the flow of product vapor from said tank, an outlet line near the bottom of said tank for flow of liquid from said tank, a valve in said liquid outlet line, a fluid inlet line leading from a well to said tank, a liquid level float assembly attached to said tank, the float of said float assembly being responsive to the level of liquid in said tank, said float assembly having a lever arm connected to said float, said lever arm being connected with said valve in said liquid outlet line, a pilot valve attached to an extension of said lever arm, said pilot valve cooperating with said float assembly, a pressure fluid conduit connecting said pilot valve to said tank, a valve body in said fluid inlet line having a valve seat and a spherical valve head in said body, a push rod in said valve body for moving said valve head out of said body, a cylindrical extension attached to said valve body opposite said push rod, a piston in said cylindrical extension for moving said valve head into said valve body, a first pressure fluid conduit leading from said pilot valve to the end of said cylindrical extension, and a second pressure fluid conduit leading from said pilot valve to said cylindrical extension intermediate said end and said valve body.

2. The apparatus of claim 1, wherein said piston is a fluid operated piston.

3. The apparatus of claim 1, wherein said push rod is a manually operable push rod.

4. In the apparatus of claim 1 a by-pass conduit attached to said fluid inlet line on either side of said valve in said inlet line and a manually operable valve in said by-pass line.

References Cited in the file of this patent

UNITED STATES PATENTS

| Number | Name | Date |
| --- | --- | --- |
| 489,799 | Ford | Jan. 10, 1893 |
| 816,306 | Dyblie | Mar. 27, 1906 |
| 1,492,963 | Conrader | Apr. 24, 1923 |
| 1,677,096 | Browne | July 10, 1928 |
| 1,846,376 | Walker | Feb. 23, 1932 |
| 1,893,398 | Raymond | Feb. 14, 1933 |
| 2,301,972 | Richter | Nov. 17, 1942 |
| 2,348,357 | Parks | May 9, 1944 |